(12) United States Patent
Footz et al.

(10) Patent No.: US 12,060,184 B2
(45) Date of Patent: Aug. 13, 2024

(54) METHOD OF SEALING A COMPOSTABLE CONTAINER BY DEFORMING A PORTION OF THE CONTAINER

(71) Applicant: Nexe Innovations Inc., Surrey (CA)

(72) Inventors: Darren Joseph Footz, Surrey (CA); Kianoush Karimi Pour Kerman, Vancouver (CA)

(73) Assignee: Nexe Innovations Inc., Surrey (CA)

( * ) Notice: Subject to any disclaimer, the term of this patent is extended or adjusted under 35 U.S.C. 154(b) by 0 days.

(21) Appl. No.: 17/570,188

(22) Filed: Jan. 6, 2022

(65) Prior Publication Data

US 2022/0234773 A1 Jul. 28, 2022

Related U.S. Application Data (60) Provisional application No. 63/134,508, filed on Jan. 6, 2021.

(51) Int. Cl.
*B65B 51/22* (2006.01)
*B65B 29/02* (2006.01)

(52) U.S. Cl.
CPC .......... *B65B 51/225* (2013.01); *B65B 29/022* (2017.08)

(58) Field of Classification Search
None
See application file for complete search history.

(56) References Cited

U.S. PATENT DOCUMENTS

| | | | | |
|---|---|---|---|---|
| 3,336,729 | A * | 8/1967 | Logemann | B65B 7/2892 53/366 |
| 4,553,668 | A * | 11/1985 | James | B65D 71/00 53/436 |
| 2017/0355515 | A1 * | 12/2017 | Marcinkowski | A47J 31/407 |
| 2018/0118382 | A1 * | 5/2018 | Vernier | B65D 85/76 |
| 2018/0229923 | A1 * | 8/2018 | Cabilli | B65D 85/8043 |
| 2018/0319582 | A1 * | 11/2018 | Footz | B65B 29/022 |

FOREIGN PATENT DOCUMENTS

| | | | | | |
|---|---|---|---|---|---|
| WO | WO-2020127147 | A1 * | 6/2020 | | B31B 50/25 |
| WO | WO-2020157460 | A1 * | 8/2020 | | A24F 40/42 |

* cited by examiner

*Primary Examiner* — Tanzim Imam
(74) *Attorney, Agent, or Firm* — Perkins Coie LLP (57) ABSTRACT

A fully compostable beverage capsule may be produced by improving the seal strength between the capsule and its lid. In this invention, a number of protruding tabs are added to the upper and/or lower edges of the capsule. The lidding is then attached to the capsule via an energetic welding process, such as ultrasonic welding. In this process, the protruding tabs are folded over the edge of the capsule and deformed, increasing the surface area contact between the capsule and its lidding. Acting similarly to a swage fitting, these spikes will improve the strength of the seal that forms between the lidding and the capsule.

14 Claims, 3 Drawing Sheets

Process

Fig.1 Content - High Level Diagram

Fig.2 3D View

Fig.3 Cross section

Fig.4 Process

Fig.5 Method

METHOD OF SEALING A COMPOSTABLE CONTAINER BY DEFORMING A PORTION OF THE CONTAINER

CROSS-REFERENCE TO RELATED APPLICATIONS

The present application claims the priority benefit of U.S. provisional patent application 63/134,508 filed Jan. 6, 2021, the disclosure of which is incorporated herein by reference.

FIELD OF THE DISCLOSURE

The present disclosure relates to a beverage cartridge such as, for example, a compostable beverage cartridge for single-serve use. The present disclosure further relates to methods of manufacture and uses thereof. The present disclosure further relates to methods of improving the lidding seal of a compostable beverage cartridge.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Single-serve beverage cartridges have become a dominant method for serving beverages, especially hot beverages, in a variety of settings such as homes, offices, waiting rooms, hotel rooms and lobbies, and other places where people consume beverages. The rapid growth of single-serve beverage cartridges is driven by consumer preference for convenient, quickly prepared beverages in single-portion quantities, in a variety of flavors, beverage types (coffee, espresso, decaffeinated coffee, tea, decaffeinated tea, cider, hot cocoa/chocolate, bone broth, and even alcoholic beverages, such as, for example, Irish Coffee, Hot Toddy, Hot Buttered Rum, etc.). Even within a beverage type, such as coffee, there may be a plurality of roasts and associated roasters, flavor profiles, flavor additives, caffeine strengths, location, or locations of origin, etc.

The convenience and variety of single serving beverage cartridges allows and encourages consumers to prepare and consume a plurality of beverages throughout the day. This pattern of consumption causes the rapid accumulation of used beverage cartridges wherever they are consumed. Due to the nature of single-serving beverage cartridges, a considerable amount of packaging waste is produced per beverage consumed compared to preparing beverages by traditional means, such as, for example, preparing a plurality of servings at once using bulk ingredients. Packaging waste, according to the United States Environmental Protection Agency (EPA), defines containers and packaging as products that are assumed to be discarded the same year the products they contain are purchased. The EPA further estimates that the majority of the solid waste are packaging products. Packaging waste contributes significantly to global pollution, the introduction of contaminants into the natural environment that cause adverse change, which poses a health risk many forms of life, including humans, other animals, plants, fungi, etc.

Single-serve beverage cartridges typically comprise several components made of various materials. The typical components of a single-serve beverage cartridge include, at least, a container, typically made from plastic such as polyethylene, a filter, typically made from plant fiber such as abaca fibers or other natural and synthetic fibers, and a container lid, typically made from food-grade aluminum foil, which is also commonly printed upon to include product labelling. Some beverage cartridges do not contain a filter, typically because the beverage material is readily soluble in hot water (such as, for example, hot cocoa). The container will usually comprise an opening on the top of the container, and a hollow cavity within which and across which a filter may be disposed. The container may also comprise an opening at on the bottom container. After the filter and beverage material are inserted into the container, the lid is then typically sealed over the container opening or openings. The sealed lid typically provides an airtight seal, preventing the exchange of gases between the environment and the interior of the container, thus preventing oxidation and/or spoilage of the beverage material. In beverage cartridges that comprise a filter, the filter may separate the container into two chambers: a first chamber occupying the space within the container between the filter and the opening of the container, the first chamber for holding dry beverage ingredients such as, but not limited to, coffee, tea, or cocoa, for a single beverage serving; and (ii) a second chamber occupying the space within the container between the filter and the base of the container, the second chamber being on the opposite side of the filter to the first chamber. The purpose of the second chamber is typically to provide a space in which a fluid extractor of a beverage brewing device may be inserted into the bottom of the container, entering the second chamber and allowing the extraction of fluid from the cartridge without the fluid extractor entering the first chamber, such that fluid must flow through the beverage material and the filter before exiting the cartridge via the fluid extractor. However, the presence of the second chamber may significantly reduce the space within the container that can be occupied by beverage medium. This may be problematic as the total amount of beverage material disposed within the container may significantly contribute to the final concentration of the beverage, typically measured in Total Dissolved Solids (TDS). It may be advantageous to minimize the volume of the second chamber in order to maximize the volume on the third chamber, thereby maximizing the total volume available for beverage material. However, the fluid extractor is typically comprised of a sharp, hollow needle-like piercing element designed to easily pierce through the bottom of the container, such that if the second chamber is reduced in size, the fluid extractor may penetrate or damage the filter, allowing the beverage material to exit the first chamber, and ultimately exit the cartridge via the fluid extractor. Thus, in the event the fluid extractor penetrates or damages the filter, the beverage material may be transported into the final beverage, which may be undesirable to consumers (such as, for example, the presences of coffee grounds in a prepared cup of coffee) and may potentially damage the beverage brewing machine (for example, by way of clogging the fluid extractor with beverage material).

The cover is disposed over the opening of the container (which may be, for example, over the top of the container, and/or bottom of the container), and keeps the dry beverage ingredients within the container, as well as providing an airtight seal to prevent the oxidation and other types of degradation of the container's contents. In practice, a single-serving beverage cartridge is placed into a compartment of a brewing machine. The machine is activated such that a fluid injector penetrates the cover of the cartridge and a fluid extractor penetrates the base of the cartridge (which may also be a cover). The fluid injector injects a brewing medium (e.g. hot water) into the first chamber for extracting beverage components from the ingredients. The brewing medium containing the extracted beverage components percolates through the filter and into the second chamber. The brewing medium containing the extracted flavours is then extracted by the fluid extractor and finally dispensed as a drinkable beverage.

Currently, the container of a beverage cartridge for single-serve use is typically made from petroleum-based plastic materials which are neither biodegradable nor compostable. In some cases, the container may be made of petroleum biodegradable materials, such as Polybutylene adipate terephthalate (PBAT). While these materials may eventually biodegrade, they are not desirable for use in home or industrial composting settings, as they may pollute the compost with petroleum residue, microplastics, and other chemicals that may not be desirable for compost. Composting is the mixing of various decaying organic substances, such as dead plant matter, which are allowed to decompose to the point that various waste products of the composting process provide nutrients to be used as soil conditioners/fertilizers. Composting can be aerobic, anerobic, and/or vermicomposting, depending on the environment in which the compost is prepared. Aerobic composting is the decomposition of organic matter by microbes that require oxygen to process the organic matter. The oxygen from the air diffuses into the moisture that permeates the organic matter, allowing it to be taken up by the microbes. Anerobic composting is the decomposition of organic matter by microbes that do not require oxygen to process the organic matter. To be anerobic, the system must be sealed from the air, such as with a plastic barrier. Anerobic compositing produces an acidic environment to digest the organic material. Vermicomposting is the decomposition of organic matter by worms and other animals (such as soldier flies). A portion of the organic matter is converted to vermicast, or castings from the worms or other animals. The breakdown of the organic matter into vermicast yields an effective soil conditioner and/or fertilizer.

The cover of a beverage pod is typically made of a metal foil (e.g., aluminum) or a metal foil laminate which is glued to the top of the container. Generally, neither the metal foil of the cover nor the glue affixing the cover over the opening of the container is biodegradable, compostable, or made from readily renewable resources. As a result, non-biodegradable and non-compostable beverage cartridges typically end up in landfills, thereby at least contributing to environmental concerns associated with disposal of trash. This may be especially problematic due to the fact that traditional means of brewing beverages, e.g., using solely beverage material and filter material, or a filtration device (such as a French press, or a wire mesh filter) may yield a completely compostable waste product (e.g., spent coffee grounds and potentially a used paper filter).

Attempts have been made to recycle plastic beverage pods in some cases. Recycling has many issues which effect the efficacy and practicality of these programs. The first is collection and transportation. Collection largely requires voluntary compliance by consumers. Some deposit programs encourage consumers to return recyclable materials, however this accounts for very few recyclable materials. Collection is further complicated by the need to further transport the materials to a facility which can process them. Many of these facilities are run by municipalities as recycling operations frequently lack economic viability without government subsidies. Recycling of plastics and other materials is further complicated by cross contamination and downcycling. Cross contamination is the presence of foreign materials not desired in the end product and can include materials such as other non-recyclable waste, or other recyclable wastes not compatible with the desired recycled material which can include other plastics. This requires sorting and cleaning of materials. This process can be partially automated; however, it also requires manual sorting and inspection which adds cost, reduces the amount of material that can be processed and inevitably results in a less pure product than when using virgin material. This frequently results in downcycling.

Downcycling is the term used to describe the reduction of quality in recycled materials compared to materials prior to being recycled. Impurities introduced during processing, from non-recyclable waste that could not be removed, or from other plastics and materials can make the resulting material unsuitable for use in their original applications. As such, the applications for recycled materials, especially plastics, are limited, as is the number of times that plastics can be recycled.

Beverage containers, such as instant beverage cups or pods, are particularly difficult to recycle. Not only do they have non-recyclable material contained within them that would first need to be removed, but they are also frequently comprised of at least two different materials, such as a plastic cup and an aluminum foil lid. When the lid is made of plastic, it is often a different type than the cup, and would require separation prior to processing when being recycled. This increases the complexity of the recycling operation, requiring at least three separate streams for each type of refuse, each requiring their own preparation. Furthermore, the small size of these beverage pods creates a disproportionate amount of effort required to recycle a small amount of material. The separation of materials would ideally be performed by the consumer prior to recycling; however, this inconvenience will inevitably result in consumers recycling the beverage containers without proper preparations, or failing to recycle the container at all, electing to discard the container as trash. One of the major advantages of using beverage pods is consumer convenience, such that a beverage can be prepare by simply inserting a cartridge into a machine that performs all other brewing functions. It is therefore undesirable to instruct consumers to disassemble and sort various materials from the beverage pod, and due to the diminutive size of beverage pods, this may not be physically possible for consumers without fine motor skills necessary to disassemble such an item. The result is a required step of preprocessing the containers before they can be recycled to ensure the materials are separated and the recyclable material sufficiently cleaned.

Plastics are traditionally sourced from petroleum. They are processed with chemicals to create polymers which can then be formed into shapes. Such polymers that are heated to be formed and then hold their shape when cooled are called thermoplastics. Many of the chemicals used to produce these polymers are inherently toxic and can leech into the contents. This is why few types of plastics are approved for use with foods. Some materials may be safe storing some types of food products, such as dry goods, however when a solvent is introduced, the chemicals in the plastic can go into solution. In the past, some plastics that were previously approved for use with foods have been found to leech chemicals, such as BPA (Bisphenol A). Other chemicals that can be found in plastics include thalates, antiminitroxide, brominated flame retardants and poly-fluorinated chemicals. Depending on the chemical and the manner in which the plastic is being used, it can cause problems including irritation in the eye, vision failure, breathing difficulties, respiratory problems, liver dysfunction, cancers, skin diseases, lung problems, headache, dizziness, birth defects, as well as reproductive, cardiovascular, genotoxic and gastrointestinal issues.

There has been a push from some governments to mandate composting and increase the amount of recycled material to reduce the amount of waste being incinerated or buried in landfills. Some laws such in the European Union, set specific targets, such as 65% of waste recycled by 2035. In the United States, there is no national law, but roughly half of states have some form of recycling law and municipalities may further add to these laws resulting in a varying patchwork of regulations and mandates. Some laws are very limited, requiring that some bottles and cans be recycled. Many of these states also add deposits to bottles, adding monetary value and incentive to returning them for recycling. Others require only specific recyclable materials be recycled, while others may be permitted to be discarded in the trash. Some states go further, mandating that compostable waste be disposed of properly, either in a home composter, or via an industrialized composting operation.

A further complication to composting plastics is that not all plastics break down the same. Some plastics, whether petroleum based or bioplastics, which originate from biomass, are biodegradable. Only a small subset of these are also compostable. The distinction lies in how quickly the plastic breaks down, and whether the process of degradation releases harmful chemicals into the environment. Compostable plastics typically degrade within 12 weeks, wherein biodegradable plastics will typically break down within 6 months. Ideally, compostable plastics would break down at the same rate as common food scraps, about 90 days.

Another class of plastics are OXO-degradable plastics. These are different than biodegradable plastics in that they are traditional plastics with additional chemicals which accelerate the oxidation and fragmentation of the materials under UV light and/or heat. This allows the plastics to break down more quickly, however the result is pollution from microplastics, as the plastic molecules themselves do not degrade any faster than their traditional plastic counterparts. There have been efforts in some jurisdictions to ban these plastics.

Beverage cartridges or pods designed for use in single-serve beverage machines (for instance, Keurig K-cups, Nespresso capsules, etc.) are generally constructed from petroleum-based plastics and adhesives and metal foils used for the lidding material. The specific materials and the manner in which they are assembled create waste that is difficult or impossible to re-use or recycle.

Compostable capsules or pods could provide a more environmentally-friendly alternative to the standard design. The petroleum-based plastic of the capsule itself may be replaced with a biodegradable plastic, but the petroleum-based adhesive and foil lidding are not suitable for composting. Therefore, there is a need for fully compostable lidding materials for single-serve beverage capsules that do not rely on petroleum-based adhesives to maintain a seal during storage and beverage preparation. This poses a significant challenge, since beverage preparation requires that the lidding material be exposed to significant levels of water pressure and heat.

A fully compostable beverage capsule requires that both the capsule and its lid to be constructed from biodegradable materials and that they are joined without an adhesive, due to the fact most suitable adhesives are petroleum-base or otherwise not compostable, or compostable types of adhesive may be cost-prohibitive or otherwise unsuitable (e.g., not able to withstand the conditions of beverage-preparation, not safe for food-preparation, etc.). Moreover, compostable lidding material may be constructed of multiple layers of various materials, such as a PLA film and cellulose fiber paper. Current attempts to join the capsule and lid using energetic welding (i.e., ultrasonic welding) have not produced adequate seals. Specifically, when the capsule is subjected to high heat and pressure during the beverage brewing process, the lid tends to separate from the capsule, and/or layers of the lidding material may delaminate (e.g., the PLA film layer begins to separate from the cellulose fiber paper). This separation and/or delamination may create a mess for the consumer, clog elements of the brewing machine, disrupt the cartridge ejection mechanism in some beverage-brewing devices (e.g. Nespresso), causing an inconvenience to the user, and/or results in a poorer quality beverage. Thus, a superior method is needed to seal the lidding material(s) to the capsule and produce a fully compostable capsule.

Therefore, there is a need for fully-compostable beverage capsule or pod that consistently and cleanly produces high quality beverages will lessen the environmental impact of single-serve beverage brewing systems and increase their appeal to consumers.

BRIEF DESCRIPTIONS OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
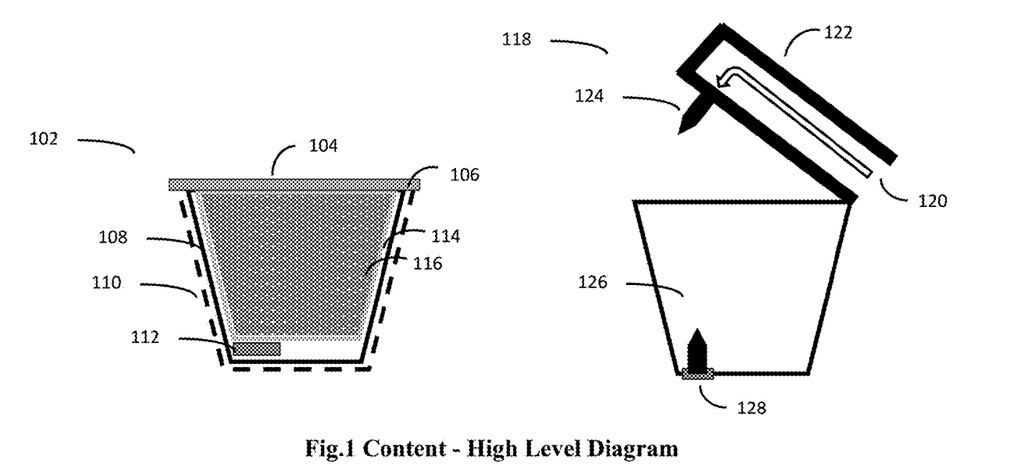
FIG. 1: Illustrates a Compostable Beverage Pod, according to an embodiment.

FIG. 1 is a system for a Compostable Beverage Pod. This system comprises of Beverage pods, or beverage cartridges, are containers, pods, capsules, etc., for use in a beverage brewing machine, such as a coffee maker. They may include one or more of, a beverage medium that is either soluble or insoluble, one or more filters and a first portion in which liquid is passed into and a second portion through which liquid passes out of the cartridge. In some instances, they are portioned beverage packages often contain a water-soluble material, to make a drink such a hot chocolate, chai tea, etc. These portioned packages can be pouches as well as pods for beverage brewing machines, element 102. Beverage cartridges can contain a number of components, including pod lid, capsule lid, or cartridge lid, is one component of a beverage pod, often made of foil, that is sealed to the pod, cartridge, capsule, etc., so as to contain the beverage medium. A compostable capsule lid may be comprised of, for example a PLA web film (which may contain a proportion of PHA, in some embodiments), a cellulose paper film, etc., element 104. In a preferred embodiment, the lidding material is a multi-layer film comprising at least one layer of PLA film and at least a second layer of cellulose paper. Such a lidding material may have desirable properties for lidding material, such as being fully compostable, providing an air-barrier for the pod contents prior to beverage brewing, an maintain a look-and-feel of a fully compostable beverage pod. The pod bond is the connection between any two of the capsule lid, capsule outer shell, and capsule interior. This bond can be mechanical or chemical, and such as adhesives, heat sealing, ultrasonic welding, etc. The pod bond and the filter bond can be in one place or separately depending upon the use case. A filter bond is a type of capsule bond that binds the filter medium to a portion of the capsule, such as by ultrasonic welding, adhesives, thermal sealing, etc., element 106. In a preferred embodiment, the pod bond is an thermoplastic weld using an energetic process, such as ultrasonic welding, which welds the PLA film of the lidding material to the PLA pod capsule. Such a bond is preferred since it does not require adhesives, which are not desirable in fully-compostable packaging products. A pod exterior, or capsule, or cartridge is the outer shell of the beverage cartridge. The exterior can be made of plastic (especially compostable plastic, such as PLA, PHA, or combinations thereof), cellulose, etc. It has similar properties to other thermoplastic polymers such as polypropylene (PP), polyethylene (PE), or polystyrene (PS). This allows it to serve as a biodegradable alternative for coffee pods. It can also be made from polyhydroxyalkanoates (PHAs), which are a biodegradable polyester produced through bacterial fermentation of sugar or lipids. They can be used as alternatives to other synthetic plastics. The mechanical properties of PHAs can be modified for a given use case by blending it with other biodegradable polymers, such as PLAs. They can also be made from poly(L-lactide) (PLLA), which is a polymer that is also biodegradable and compostable. The material may be used to form various aspects of the beverage cartridge. PLLA is also readily renewable, typically made from fermented plant starch such as from corn, cassava, sugarcane, or sugar beet pulp. Cellulose fibers are fibrous materials made from plant materials such cotton, flax, wood pulp, etc. They provide a biodegradable filter material that could be used in coffee pods. Other materials that are biodegradable plastic alternatives include petroleum based plastics such as, Polyglycolic acid (PGA), Polybutylene succinate (PBS), Polycaprolactone (PCL), Polyvinyl alcohol (PVOH) and Polybutylene adipate terephthalate (PBAT), element 108. In a preferred embodiment, the pod exterior comprises deformable protrusions which may improve the strength of the pod bond 106. The protrusions may be deformed in at least one stage of the pod assembly process, and may increase surface area contact between the pod lid 104 and the pod exterior 108. Beverage cartridges can also contain a capsule interior that is separate from a filter, in beverages that have an insoluble beverage material such as coffee. The capsule interior can be used for a number of purposes, including, providing material properties such as structural integrity (e.g., provide addition strength to resist the pressure of liquid injection in the process of brewing a beverage, which may crack or otherwise compromise the beverage pod), or altering the biodegradability or rate of the beverage pod in some embodiments, element 110. A filter guard, or faceplate, is a solid structure integrated into a beverage pod that prevents the outlet piercing element from creating a path for the insoluble beverage material from inside the filter to the outlet. In some embodiments, the capsule interior may include integrated features to act as a filter guard, removing the requirement for a discrete component, element 112. A filter is a medium, such as spun bond PLA web, paper (cellulose), cloth or metal, that is used to prevent an insoluble beverage material from leaving the beverage pod and entering the beverage brewing machine or the beverage. Filters can be symmetrical (e.g., fluted), or asymmetrical (e.g. pleated), element 114. Beverage material is the material used to produce a brewed beverage, such as coffee grounds, tea, or a mix beverage where the beverage material is soluble, such as hot chocolate. Beverage material may include any flavorings, nutritional content (e.g., any oils, nutritional supplements, active ingredients such as pharmaceuticals, cannabinoids, etc.), alcohol, coloring, or any other composition which has an effect on the final beverage, element 116. Beverage brewing machines for brewing portioned beverages from pre-packed beverage pods exist for a variety of beverages made from a beverage material that is either insoluble, such as coffee, or soluble, such as hot chocolate. A beverage brewing machine will typically contain many other components, such as, for example, a heating element, a liquid reservoir or plumbing component, a liquid pump, an exterior chassis, a controller for the brewing process, a display or indicator lights and sounds, a user interface including buttons or a touchscreen, a tray to catch spillage, etc. For the purposes of description, it is assumed a beverage brewing machine contains all components necessary to accomplish the beverage brewing process, though specific reference to beverage brewing machine components may only be made to those components which come into direct contact with the beverage pod, such as the brewing chamber, a fluid injecting component, and a fluid extracting component, element 118. A beverage brewing machine will contain the following elements: A beverage brewing machine will contain the following elements: A fluid source that supplies the liquid, usually water, to the brewing machine for producing the desired beverage, element 120. A brewing chamber lid that opens to allow a new pod to be added to the machine, and in many of the most common embodiments of a beverage brewing machine, the chamber lid contacts the fluid source to the brewing pin, but the fluid source does not have to be in the brewing chamber lid, element 122. A brewing pin member, or fluid injecting component, that typically has a piercing element to puncture the beverage pod lid, that provides a liquid, typically hot water, to mix with the beverage medium to create the beverage, element 124. A brewing chamber, receptacle, or sieve holder, into which the beverage pod is placed so that a beverage can be brewed, element 126. An outlet, or fluid extracting component, that typically has a piercing element to puncture the bottom of the beverage pod to allow the brewed beverage to leave the brewing chamber. Depending upon the embodiment, it may pierce or deform other components of the beverage pod, element 128. The brewing chamber 126 is a common location for pod bond 106 to fail, by becoming delaminated. In such instances, the pod lid 104 may separate from the pod exterior 108, and/or layers of pod lid 104 may separate. The failure of the pod bond may result in in beverage material escaping the pod, causing mess and lower quality beverage, may cause the beverage pod to become stuck in the brewing chamber 126, may cause the pod lid 104 to become stuck on the brewing pin 124 and/or the outlet 128. In a preferred embodiment, pod bond 106 has increased strength caused by deforming protrusions of the pod exterior 108, shown in subsequent figures.

Elements of the 3D View of a Compostable Beverage Pod will now be explained with reference to FIG. 2. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 2:
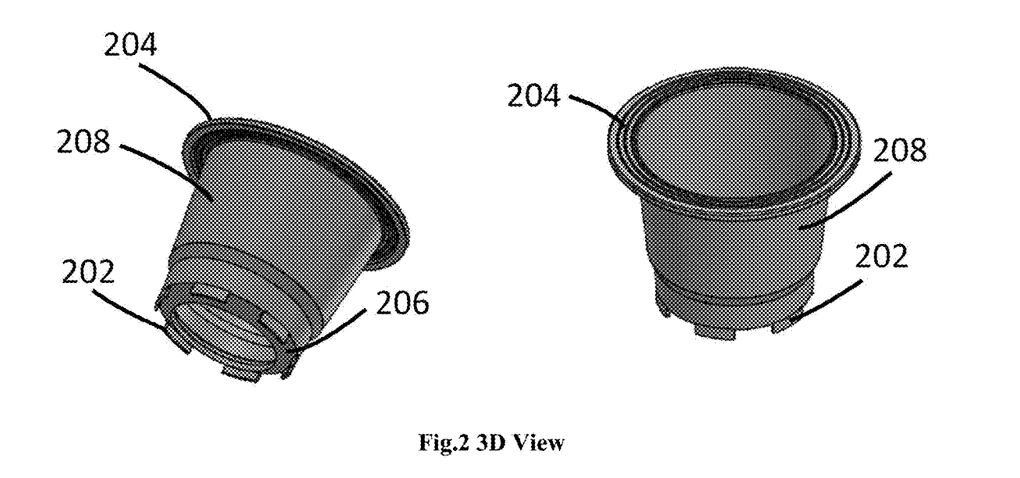
FIG. 2: Illustrates a 3D View of a Compostable Beverage Pod, according to an embodiment.

FIG. 2, 3D View of a Compostable Beverage Pod. The figure shows Small protrusions connected to the bottom lid sealing lip; these tabs may be any appropriate length and, in cross section, may be circular, oval, rectangular, triangular, or another shape; the ends of the tabs may be tapered or blunt; these tabs are capable of increasing the surface area of contact between the lidding material and the bottom lid sealing lip. In a preferred embodiment, the tabs may be deformed to fold over the lidding material in a manufacturing process, and the protrusions may subsequently be flattened or otherwise deformed by an energetic process (e.g. ultrasonic welding) to create a seal with the lidding material resembling a swage fitting; in the present embodiment, tabs are shown on the bottom lid sealing lip, but could also be present on the top lid sealing lip or only on the top lid sealing lip element 202. The upper outer edge of the capsule, which includes a flat surface onto which lidding may be attached; the surface of the lip may be flat, lightly roughened, or be enhanced with grooves, ridges, or another similar shape; the lidding may be attached to all or a portion of the surface of the top lid sealing lip; in some embodiments, the top lid sealing lip may have a number of tabs protruding from its surface (as is shown on the bottom lid sealing lip in the diagram) element 204. The lower outer edge of the capsule, which includes a flat surface onto which lidding may be attached; the surface of the lip may be flat, lightly roughened, or be enhanced with grooves, ridges, or another similar shape; the lidding may be attached to all or a portion of the surface of the top lid sealing lip; in the present embodiment, a number of tabs protrude from the bottom lid sealing lip element 206. The vertical walls of the capsule; the vertical walls may meet the top and bottom of the capsule at any angle the creates a pod or capsule of appropriate shape for the beverage machine in which it will be used; the walls may be of any appropriate thickness and/or be constructed of one or more layers of material to provide adequate strength to withstand the brewing process and contain the beverage material; the surface of the wall may be modified, for instance roughened, grooved, or imprinted for ease of handling or identification element 208.

Elements of a Cross section of a Compostable Beverage Pod will now be explained with reference to FIG. 3. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 3:
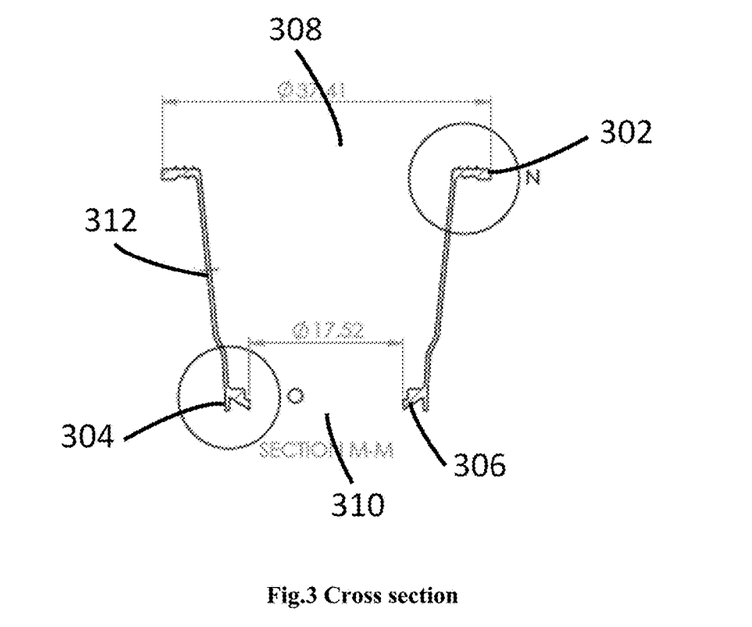
FIG. 3: Illustrates a Cross section of a Compostable Beverage Pod, according to an embodiment.

FIG. 3, a Cross section of a Compostable Beverage Pod. The figure shows The upper outer edge of the capsule, which includes a flat surface onto which lidding may be attached; the surface of the lip may be flat, lightly roughened, or be enhanced with grooves, ridges, or another similar shape; the lidding may be attached to all or a portion of the surface of the top lid sealing lip; in some embodiments, the top lid sealing lip may have a number of tabs protruding from its surface (as is shown on the bottom lid sealing lip in the diagram) element 302. Small protrusions connected to the bottom lid sealing lip; these tabs may be any appropriate length and, in cross section, may be circular, oval, rectangular, triangular or another shape; the ends of the tabs may be tapered or blunt; these tabs are capable of increasing the surface area of contact between the lidding material and the bottom lid sealing lip. In a preferred embodiment, the tabs may be deformed to fold over the lidding material in a manufacturing process, and the protrusions may subsequently be flattened or otherwise deformed by an energetic process (e.g. ultrasonic welding) to create a seal with the lidding material resembling a swage fitting; in the present embodiment, tabs are shown on the bottom lid sealing lip, but could also be present on the top lid sealing lip or only on the top lid sealing lip element 304. The lower outer edge of the capsule, which includes a flat surface onto which lidding may be attached; the surface of the lip may be flat, lightly roughened, or be enhanced with grooves, ridges, or another similar shape; the lidding may be attached to all or a portion of the surface of the top lid sealing lip; in the present embodiment, a number of tabs protrude from the bottom lid sealing lip element 306. The open upper surface of the capsule; the opening may extend across the entire upper surface of the capsule or only a portion thereof; the opening is appropriately sized to allow the capsule to be filled with beverage material, a filter, or other needed components; in some embodiments, a top opening may not be required if filling can be achieved via the bottom opening only element 308. The open lower surface of the capsule; the opening may extend across the entire lower surface of the capsule or only a portion thereof; the opening is appropriately sized to allow the capsule to be filled with beverage material, a filter, or other needed components; in some embodiments, a bottom opening may not be required if filling can be achieved via the top opening only element 310. The vertical walls of the capsule; the vertical walls may meet the top and bottom of the capsule at any angle the creates a pod or capsule of appropriate shape for the beverage machine in which it will be used; the walls may be of any appropriate thickness and/or be constructed of one or more layers of material to provide adequate strength to withstand the brewing process and contain the beverage material; the surface of the wall may be modified, for instance roughened, grooved, or imprinted for ease of handling or identification element 312.

Functioning of a Process diagram for sealing a Compostable Beverage Pod will now be explained with reference to FIG. 4. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
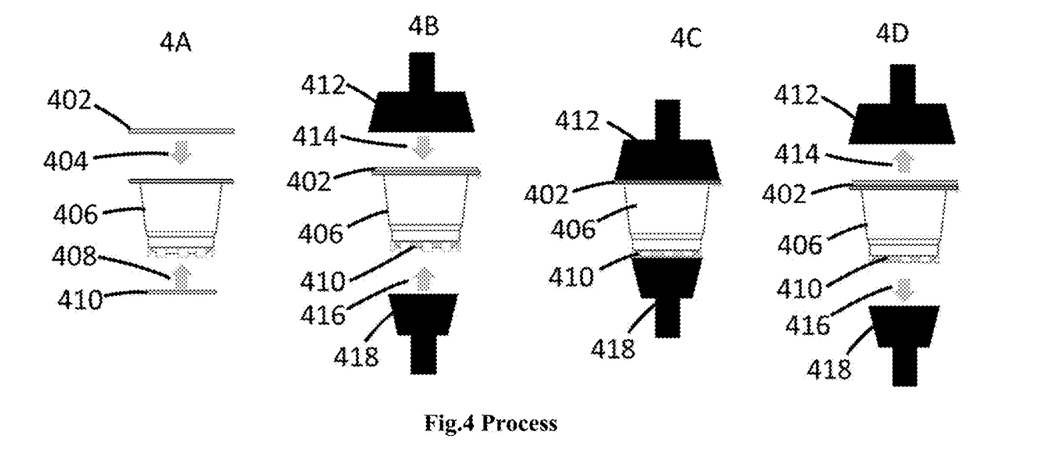
FIGS. 4A, 4B, 4C, and 4D: Illustrate a Process diagram for sealing a Compostable Beverage Pod, according to an embodiment.

FIG. 4, a Process diagram for sealing a Compostable Beverage Pod. The figure shows a thin piece of biodegradable polymer, appropriately shaped and sized to fit against the top lid sealing lip; for example, a piece of lidding made of polylactic acid (PLA), polylactic co-glycolic acid (PLGA), polybutylene succinate (PBS), polybutylene adipate terephthalate (PBAT), polyhydroxyalkanoates (PHA), Polyhydroxybutyrate (PHB), modified cellulose or similar starch blends, or a combination of such materials; note that in FIG. 4A the lidding material is separate from the capsule; in FIG. 4B it is in contact with the sealing lip; in FIG. 4C it is energetically welded to the capsule sealing lip; and in FIG. 4D a tight seal has been created between the lidding material and the capsule element 402. The path by which the top lidding is brought into contact with the top lid sealing lip; the path brings the lidding material inside the tabs, if present, so that the tabs may be folded over the lidding material in a subsequent step element 404. A capsule of biodegradable material designed for use in a beverage brewing machine, such as a coffee maker; they may include one or more of, a beverage medium that is either soluble or insoluble, one or more filters and a first portion in which liquid is passed into and a second portion through which liquid passes out of the cartridge element 406. The path by which the bottom lidding is brought into contact with the bottom lid sealing lip; the path brings the lidding material inside the tabs, if present, so that the tabs may be folded over the lidding material in a subsequent step element 408. A thin piece of biodegradable polymer, appropriately shaped and sized to fit against the bottom lid sealing lip; for example, a piece of lidding made of polylactic acid (PLA), polylactic co-glycolic acid (PLGA), polybutylene succinate (PBS), polybutylene adipate terephthalate (PBAT), polyhydroxyalkanoates (PHA), Polyhydroxybutyrate (PHB), modified cellulose or similar starch blends, or a combination of such materials; note that in FIG. 4A the lidding material is separate from the capsule; in FIG. 4B it is in contact with the sealing lip; in FIG. 4C it is energetically welded to the capsule sealing lip; and in FIG. 4D a tight seal has been created between the lidding material and the capsule element 410. A fixture that utilizes heat and/or vibrations to attach the top lidding to the top lid sealing lip; for instance, an ultrasonic welding anvil, a heat sealer, an induction sealer, a high frequency welding head, or a laser welding head element 412. The path of the upper energetic welding head during the process by which the top lidding is secured to the top lid sealing lip; if tabs are present, the welding head folds them over the lidding material and deforms them, increasing the surface area contact between the sealing lip and the lidding material; FIG. 4B shows the position of the welding head prior to sealing; FIG. 4C shows the position during sealing, as the tabs are folded over the lidding material and deformed; and FIG. 4D shows the position after sealing has been accomplished and the welding head is withdrawing element 414. The path of the lower energetic welding head during the process by which the top lidding is secured to the bottom lid sealing lip; if tabs are present, the welding head folds them over the lidding material and deforms them, increasing the surface area contact between the sealing lip and the lidding material; FIG. 4B shows the position of the welding head prior to sealing; FIG. 4C shows the position during sealing, as the tabs are folded over the lidding material and deformed; and FIG. 4D shows the position after sealing has been accomplished and the welding head is withdrawing element 416. A fixture that utilizes heat and/or vibrations to attach the bottom lidding to the bottom lid sealing lip; for instance, an ultrasonic welding anvil, a heat sealer, an induction sealer, a high frequency welding head, or a laser welding head at element 418.

Steps of a Method for sealing a Compostable Beverage Pod will now be explained with reference to FIG. 5. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
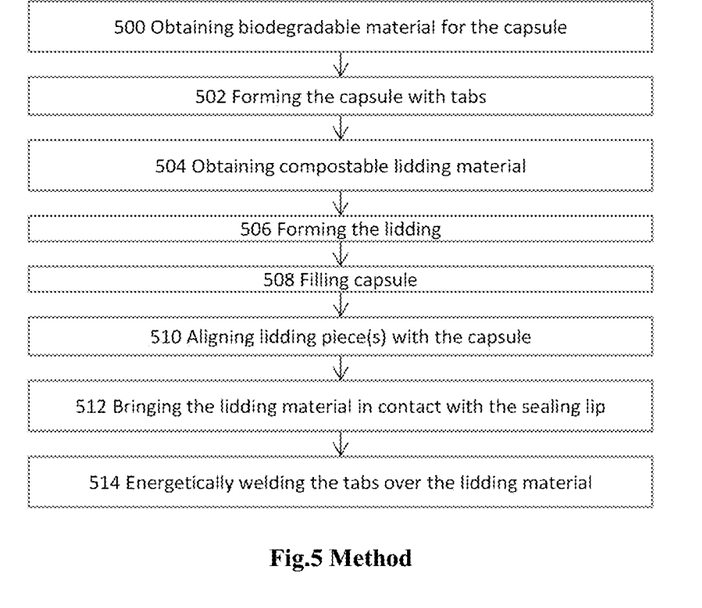
FIG. 5: Illustrates a Method for sealing a Compostable Beverage Pod, according to an embodiment.

FIG. 5 shows a Method for sealing a Compostable Beverage Pod according to an embodiment. The process begins with Obtaining a biodegradable material to form the beverage capsule; for example, polylactic acid (PLA), polylactic co-glycolic acid (PLGA), polybutylene succinate (PBS), polybutylene adipate terephthalate (PBAT), polyhydroxyalkanoates (PHA), Polyhydroxybutyrate (PHB), modified cellulose or similar starch blends, or a combination of such materials at step 502. Utilizing the selected biodegradable material, forming a beverage capsule using, for instance, thermoforming or injection molding; the capsule is created with number tabs on the top and/or bottom lid sealing lips, where the size and number are appropriate for the sealing method and the required seal strength at step 504. Obtaining a biodegradable material to form the lidding material; for example, a film of polylactic acid (PLA), polylactic co-glycolic acid (PLGA), polybutylene succinate (PBS), polybutylene adipate terephthalate (PBAT), polyhydroxyalkanoates (PHA), Polyhydroxybutyrate (PHB), modified cellulose or similar starch blends, or a combination of such materials at step 506. Utilizing the selected biodegradable material, forming at least one lidding appropriately shaped and sized to fit against the lid sealing lip; in some embodiments, lidding material may be formed using multiple layers of biodegradable material at step 508. Filling the capsule with the chosen beverage substance; for example, filling the capsule with coffee grounds, sugar, cocoa, dry milk, or other beverage components; in some embodiments, other components, such as a filter layer, may also be inserted into the capsule during this step at step 510. Aligning at least one lidding piece with the appropriate sealing lip of the capsule; for example, aligning the top lidding piece with the top lid sealing lip of the capsule and/or aligning the bottom lidding piece with the bottom lid sealing lip of the capsule at step 512. Bringing the lidding material in contact with the sealing lip on the capsule, such that the lidding material is inside the tabs, allowing the tabs to be folded over the lidding material in the subsequent sealing step at step 514. Energetically welding the lidding material to the capsule sealing lip, such that the tabs are folded over the lidding material and deformed, increasing the surface area contact and creating a tight seal between the lidding material and the capsule sealing lip; for instance, utilizing an ultrasonic welding anvil, a heat sealer, an induction sealer, a high frequency welding head, or a laser welding head to fold and deform the tabs over the lidding material and create a tight seal; this process is similar to the use of metal swage fitting at step 516.

The invention claimed is:

1. A method of sealing a compostable container by deforming a portion of the container, the method comprising:
    at least partially filling a chamber of a compostable container with one or more beverage ingredients, wherein the compostable container includes a filter, a sealing lip, and a filter guard positioned between the sealing lip and the filter to prevent contact between a piercing element of a beverage machine and the filter, and wherein the compostable container has protrusions about the sealing lip;
    providing a compostable lidding material;
    placing the compostable lidding material on the sealing lip of the compostable container;
    deforming the protrusions of the compostable container, such that the deformed protrusions lay on the compostable lidding material, wherein the compostable lidding material separates at least part of the deformed protrusions from the sealing lip of the compostable container, and wherein the deforming of the protrusions creates a swage fitting; and
    welding the deformed protrusions overlying the compostable lidding material such that the deformed protrusions hold the compostable lidding material against the sealing lip of the compostable container to create a seal,
    wherein the welding flattens the deformed protrusions overlying the compostable lidding material such that the seal between the compostable lidding material and the sealing lip is tight and resistant to delamination, and wherein the welding includes at least one of ultrasonic welding or thermal welding.

2. The method of claim 1, further comprising using a fixture head to:
    deform the protrusions about the sealing lip, and
    weld the compostable lidding material to the sealing lip while the fixture head holds the deformed protrusions against the compostable lidding material.

3. The method of claim 2, wherein the fixture head includes at least one of an ultrasonic welding anvil, a heat sealer, an induction sealer, a high frequency welding head, or a laser welding head.

4. The method of claim 1, wherein the seal is formed by cellulose of the compostable lidding material and the deformed protrusions.

5. The method of claim 1, wherein the seal is formed by the deformed protrusions and the compostable lidding material, wherein the deformed protrusions comprise polylactic acid (PLA).

6. The method of claim 1, wherein the compostable lidding material includes a PLA film.

7. The method of claim 1, wherein the seal is an adhesiveless seal formed by compostable material of the sealing lip and the compostable lidding material.

8. A method of sealing a compostable container for holding beverage ingredients, the method comprising:
    at least partially filling a chamber of a compostable container with one or more beverage ingredients;
    placing a compostable lidding material on a sealing lip of the compostable container, wherein a filter guard is positioned between the sealing lip and a filter defining the chamber, wherein the filter guard is configured to prevent contact between a piercing element of a beverage machine and the filter, and wherein the compostable lidding material includes cellulose;
    deforming, using a head fixture, protrusions of the compostable container such that the compostable lidding material is held between at least part of the deformed protrusions and the sealing lip; and
    applying energy, using the head fixture, to the deformed protrusions and the compostable lidding material to:
    create a seal formed by the cellulose of the compostable lidding material and the sealing lip, and
    flatten the deformed protrusions using the energy such that the flattened deformed protrusions hold the compostable lidding material against the sealing lip to help maintain the seal, wherein both the flattened deformed protrusions and the sealing lip have a composition that is different from a composition of the compostable lidding material.

9. The method of claim 8, wherein the energy includes ultrasonic energy or thermal energy.

10. The method of claim 8, wherein the energy is applied using at least one of an ultrasonic welding anvil, a heat sealer, an induction sealer, a high frequency welding head, or a laser welding head.

11. A method of sealing a compostable container, the method comprising:
    at least partially filling a chamber of a compostable container with one or more beverage ingredients;
    placing an upper lidding material on an upper sealing lip of the compostable container;
    placing a lower lidding material on a lower sealing lip of the compostable container, the lower sealing lip being between a filter supporting the one or more beverage ingredients and protrusions of the compostable container;
    deforming, using a lower head fixture, the protrusions of the compostable container such that the lower lidding material is held between at least part of the deformed protrusions and the lower sealing lip; and
    after deforming the protrusions,
    applying energy, using an upper head fixture, to seal the upper lidding material to the upper sealing lip, and
    applying energy, using the lower head fixture, to the deformed protrusions and the lower lidding material to:
    weld the lower lidding material to the lower sealing lip, and weld the deformed protrusions over the lower lidding material to form a tight seal between the lower lidding material and the lower sealing lip.

12. The method of claim 11, wherein the upper head fixture is an ultrasonic welding anvil, a heat sealer, an induction sealer, a high frequency welding head, or a laser welding head.

13. The method of claim 11, wherein the lower head fixture is an ultrasonic welding anvil, a heat sealer, an induction sealer, a high frequency welding head, or a laser welding head.

14. The method of claim 11, wherein a filter guard is positioned between the lower sealing lip and the filter, and wherein the filter guard is configured to prevent contact between a piercing element of a beverage machine and the filter.

* * * * *